(12) United States Patent
Maki

(10) Patent No.: US 7,269,820 B2
(45) Date of Patent: Sep. 11, 2007

(54) PROGRAM CODE GENERATOR AND PROGRAM

(75) Inventor: Yoshiyuki Maki, Kariya (JP)

(73) Assignee: Denso Corporation, Kariya (JP)

( * ) Notice: Subject to any disclaimer, the term of this patent is extended or adjusted under 35 U.S.C. 154(b) by 511 days.

(21) Appl. No.: 10/310,037

(22) Filed: Dec. 5, 2002

(65) Prior Publication Data

US 2003/0110468 A1    Jun. 12, 2003

(30) Foreign Application Priority Data

Dec. 6, 2001    (JP)    ............................... 2001-372830

(51) Int. Cl.
G06F 9/44 (2006.01)
(52) U.S. Cl. ...................... 717/106; 717/108
(58) Field of Classification Search ........ 717/100–114; 701/1–124
See application file for complete search history.

(56) References Cited

U.S. PATENT DOCUMENTS 6,236,910 B1 *   5/2001   Iwai et al. .................... 701/1
6,718,533 B1 *   4/2004   Schneider et al. .......... 717/100
6,865,458 B1 *   3/2005   Kim ............................. 701/36
2002/0052678 A1   5/2002   Maki et al.
2002/0095652 A1 *   7/2002   Iwata .......................... 717/104

FOREIGN PATENT DOCUMENTS

| JP | 04-098533 | 3/1992 |
| JP | 5-204621 | 8/1993 |
| JP | 9-231065 | 9/1997 |
| JP | 2000-020291 | 1/2000 |
| JP | 2000-112736 | 4/2000 |
| JP | 2000-267707 | 9/2000 |

* cited by examiner

*Primary Examiner*—Meng-Al T. An
*Assistant Examiner*—Mark P. Francis
(74) *Attorney, Agent, or Firm*—Nixon & Vanderhye, P.C.

(57) ABSTRACT

Variable information, which indicates whether a variable is a vehicle specific variable that is specific to vehicle control, is added in the form of variable name to the model. In a code generating tool, an extraction engine extracts the variable name from an intermediate file to obtain the variable information, and a code generation block generates vehicle specific program code corresponding to the vehicle specific variable using a variable generation rule stored in a rule storage.

23 Claims, 8 Drawing Sheets

PROGRAM CODE GENERATOR AND PROGRAM

CROSS REFERENCE TO RELATED APPLICATION

This application is based on and incorporates herein by reference Japanese Patent Application No. 2001-372830 filed on Dec. 6, 2001.

BACKGROUND OF THE INVENTION

1. Field of the Invention

The present invention relates to technology for automatically generating a control program, which performs vehicle control and is embedded in an electronic control unit.

2. Description of Related Art

In recent years, program code generators have been developed. The program code generators model specifications of programs installed in computer systems and automatically generate a corresponding program based on abstract language that describes a corresponding model.

Examples of such abstract language include simple block diagrams (such as data flow diagrams), state transition diagrams (such as state charts) and more recently the Unified Modeling Language (UML).

These program code generators automatically generate program code from the abstract language, which resembles human thought processes. Thus, these program code generators can be used to quickly implement specification changes and thus help to shorten program development times.

However, program code generators such as those described above were developed for the purpose of developing programs that run on workstations and general purpose personal computers and are not directly applicable to developing a control program embedded in an electronic control unit of a vehicle.

This will be described more fully below.

Generally, the previously proposed program code generators define variables as global variables or automatic variables and handle them in the same way.

For example, all variables are stored in a memory area, which cannot retain its contents when the power turns off. This is, in the general purpose personal computers and the workstations, these variables are supposed to be backed up to a hard disk drive.

However, in vehicle control systems, specific variables, which are specific to vehicle control operation and must be saved or backed up, are handled in a specific manner that is different from a manner of handling ordinary variables.

More specifically, specific values, such as learning values, are stored in a specific memory area (or storage area) that is different from a memory area for storing the ordinary variables and is capable of keeping its contents even when an ignition key of the vehicle is turned off. This is due to the fact that the vehicle needs to be appropriately controlled based on previously obtained learning values, which are obtained or learned during previous operation of the vehicle, when the ignition key is turned on. Furthermore, failure information, which is required by law to be stored, must also be stored in the specific memory area that is different from the memory area for storing the ordinary variables.

That is, the specific variables, which are specific to the vehicle control operation, require a vehicle specific program.

Thus, during development of the vehicle control program through use of the previously proposed program code generator, a designer needs to manually modify the generated program code.

SUMMARY OF THE INVENTION

The present invention addresses the above disadvantage. Thus, it is an objective of the present invention to generate program code for performing vehicle control by using program code generating technique that uses abstract language as described above.

To achieve the objective of the present invention, there is provided a program code generator that is used to generate a control program, which is embedded in an electronic control unit to perform vehicle control. The program code generator generates program code, which corresponds to a processing program that constitutes at least part of the control program, based on at least one program code generation rule when abstract language, which describes specifications of the processing program, is inputted to the program code generator. The program code includes a plurality of program code segments. The program code generator includes a variable information obtaining means for obtaining variable information and a code generating means for generating at least one of the plurality of program code segments. The variable information indicates whether a variable contained in the abstract language is a vehicle specific variable that is specific to the vehicle control. The code generating means generates a vehicle specific program code segment as one of the program code segments based on the variable information, which is obtained by the variable information obtaining means, through use of a corresponding one of the at least one generation rule, which corresponds to the vehicle specific variable when the variable contained in the abstract language is the vehicle specific variable.

To achieve the objective of the present invention, there is also provided a computer program for generating program code, which corresponds to a processing program that constitutes at least part of a control program embedded in an electronic control unit to perform vehicle control, based on at least one program code generation rule when abstract language, which describes specifications of the processing program, is inputted. The program code includes a plurality of program code segments. Through use of the computer program, variable information is first obtained. The variable information indicates whether a variable contained in the abstract language is a vehicle specific variable that is specific to the vehicle control. Then, a vehicle specific program code segment is generated as one of the plurality of program code segments when the variable contained in the abstract language is the vehicle specific variable. The vehicle specific code segment is generated based on the variable information through use of a corresponding one of the at least one generation rule, which corresponds to the vehicle specific variable.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
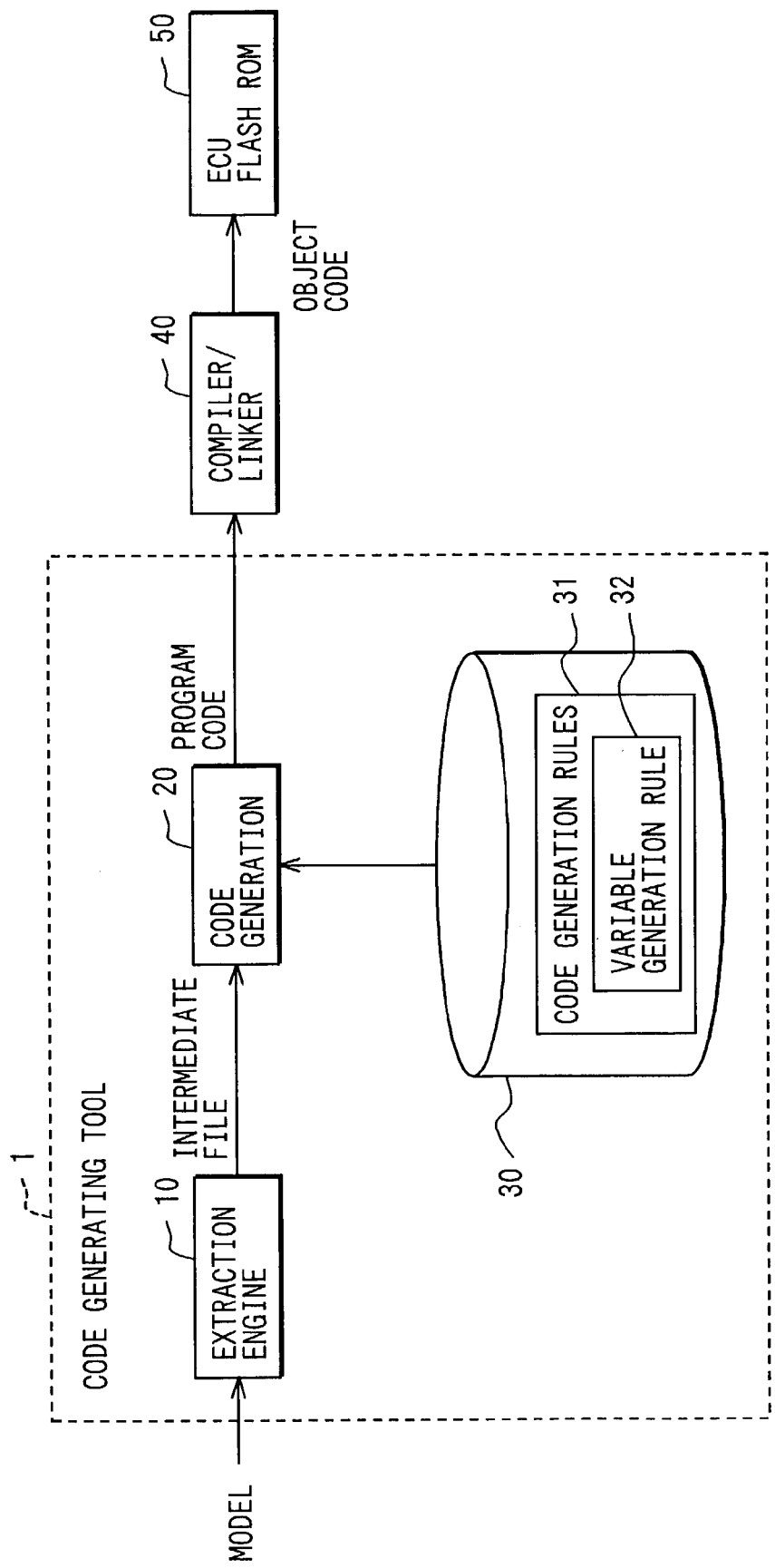
FIG. 1 is a schematic view showing the flow of program generation together with a code generating tool according to an embodiment of the present invention.

FIG. 1 schematically shows the flow of program generation together with a code generating tool (serving as a program code generator) 1 according to the present embodiment. In this embodiment, a vehicle control program is generated at the end. The code generating tool 1 generates program code from a corresponding model description (hereinafter, referred to as "model") that indicates the program specifications. This program code is source code that is converted to object code by a compiler/linker 40. The object code is then written or stored in a flash ROM of an electronic control unit (ECU) 50.

The code generating tool 1 is a general computer system and thus includes a CPU, a ROM, a RAM, an I/O interface, a bus line for connecting them, a hard disk device, input devices (such as a keyboard, a pointing device), an output device (such as a display) and a communication device for communicating with external devices.

The hardware configuration of the code generating tool 1 is thus known to one with ordinary skill in the related art. As a result, the function of the code generating tool 1 is only shown in a simple block diagram in FIG. 1.

As shown in FIG. 1, the code generating tool 1 has an extraction engine 10, a code generation block 20 and a rule storage 30.

The extraction engine 10 reads the model (abstract language) and outputs an intermediate file. At this time, each corresponding variable name is extracted from this model and is placed in the intermediate file.

The code generation block 20 generates the program code based on the intermediate file outputted from the extraction engine 10.

The rule storage 30 stores the code generation rules 31 used in the code generation block 20. The code generation rules 31 include a variable generation rule 32, that is, a rule for generating a program corresponding to a variable.

Next, the model will be described in greater detail.

The model is written in abstract language. An example of this model is a data flow diagram (DFD), such as one shown in FIG. 2.

Figure 2:
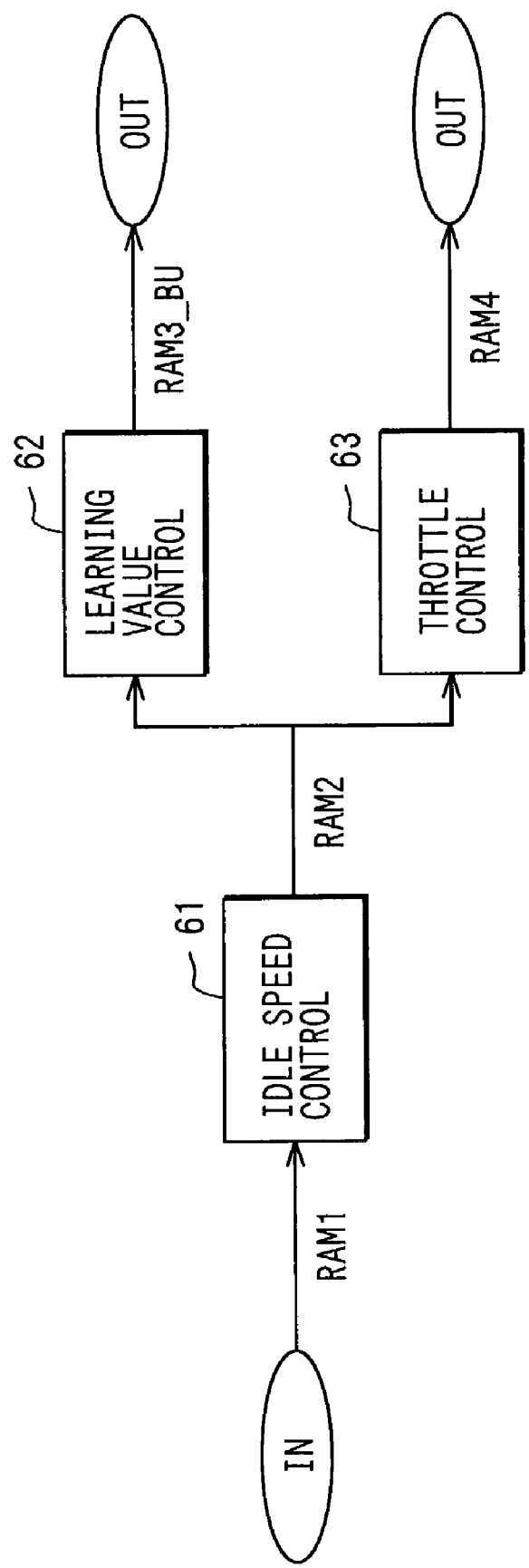
FIG. 2 is a schematic view showing a data flow diagram (DFD) as an example of a vehicle control model according to the embodiment.

The DFD shows movement of variables between control operations. In FIG. 2, idle speed control 61, learning value control 62 and throttle control 63 are shown as blocks. The diagram indicates the following. That is, a variable RAM1 is inputted to the idle speed control block 61, which then outputs a variable RAM2. Furthermore, the variable RAM2 is inputted to both the learning value control block 62 and the throttle control block 63. The learning value control block 62 outputs a variable RAM3_BU. The throttle control block 63 outputs a variable RAM4.

The variable RAM3_BU, which is outputted from the learning value control block 62, is a vehicle-specific variable (hereinafter, referred to as "back-up variable") that is specific to vehicle control operation and must be kept, or backed up, even when the ignition key is turned off. To differentiate this variable from the other variables RAM1, RAM2 and RAM4, the suffix "_BU" is appended to the variable name. That is, in the present embodiment, the variable information (i.e., information of the variable), which indicates whether the corresponding variable is the vehicle specific variable, is added to the model in the form of variable name.

It should be noted that the specifications for the idle speed control block 61, the learning value control block 62 and the throttle control block 63 as described above are provided separately.

The extraction engine 10, which extracts the variable name serving as the variable information from the model (i.e., input) and places the variable name in the intermediate file, corresponds to a variable information obtaining means of the present invention. The code generation block 20, which generates the program code using each corresponding variable name contained in the intermediate file based on the variable generation rule 32, corresponds to a code generating means of the present invention.

A code generation process, which is performed based on the variables described in the model, will be described with reference to FIG. 3.

Figure 3:
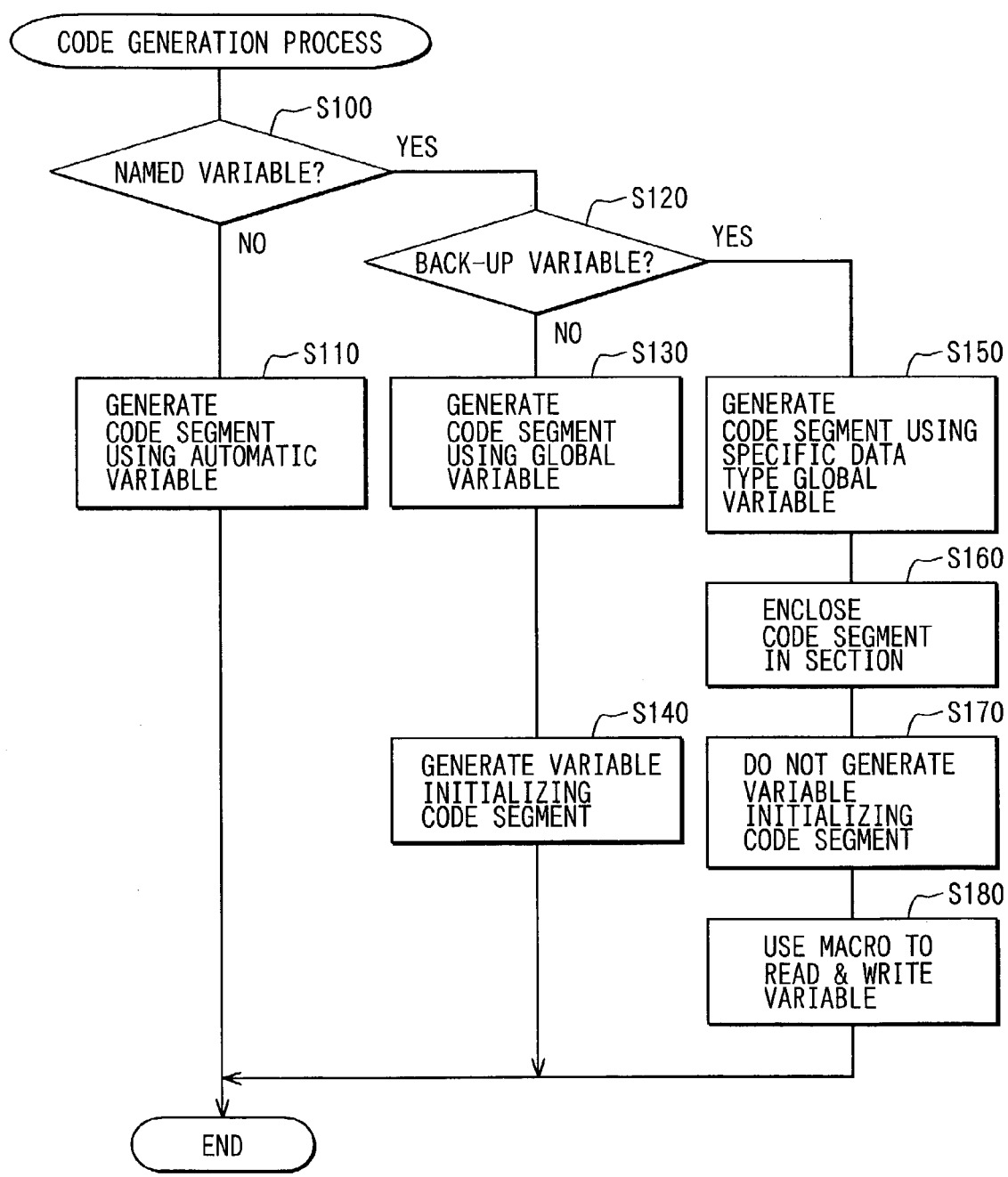
FIG. 3 is a flow chart of a code generation process for handling variables according to the embodiment.

FIG. 3 is a flow chart of the code generation process performed in the code generation block 20. This process is applied to each variable described in the model.

In the first step S100, it is determined whether the variable is a named variable that has a specified name. In the DFD shown in FIG. 2, although the names of all variables passed between the control blocks are named variables, it should be noted that some variables, such as local variables used within a particular function, do not have a specified name. When it is determined that the variable is a named variable, such as RAM1, YES is returned at step S100. Then, control moves to step S120. On the other hand, when it is determined that the variable is not a named variable (S100: NO), the variable is determined or defined as an automatic variable, and a corresponding program code segment of the program code is generated using this automatic variable at step S110. Then, the current code generation process ends.

At step S120, it is determined whether the variable is a back-up variable. This is determined by determining whether the suffix "_BU" is appended to the variable name. When it is determined that the variable is not a back-up variable (S120: NO), that is, when it is determined that the variable name does not end with "_BU", control passes to step S130. On the other hand, when it is determined that the variable is a back-up variable (S120: YES), that is, when it is determined that the variable name ends with "_BU", control moves to step S150.

At step S130, the variable is determined or defined as a global variable, and a corresponding program code segment is generated using this global variable. Then, a variable initializing program code segment for initializing the corresponding variable is generated at step S140. Upon completion of step S140, the current code generation process ends.

At step S150, the variable is determined or defined as a specific data type global variable, and a corresponding program code segment is generated using this specific data type global variable. The specific data type is a newly defined data type to which check data can be added.

At the following step S160, a program code segment, which defines the variable, is enclosed in a specific section of the program code. In this way, the back-up variables are all stored in a specified memory area, as described later.

At the following step S170, a variable initializing program code segment is not generated for the back-up variable. As described above, a variable initializing program code segment is generated for the ordinary variables, which are determined as the global variables (S140). Since the content of the back-up variable needs to be maintained, a variable initializing program code segment for initializing the back-up variable should not be generated.

At the following step S180, a program code segment for using a macro to read and write the back-up variable is generated. That is, the program code segment is generated such that the read process of the back-up variable and the write process of the back-up variable call a previously prepared library (or libraries). Upon completion of step S180, the current code generation process ends.

Steps S120 and S150 to S180 of the above-described code generation process correspond to a code generating means of the present invention.

Next, the program code generated by the above-described code generation process is described specifically below with further description of the code generation process.

Figure 4:
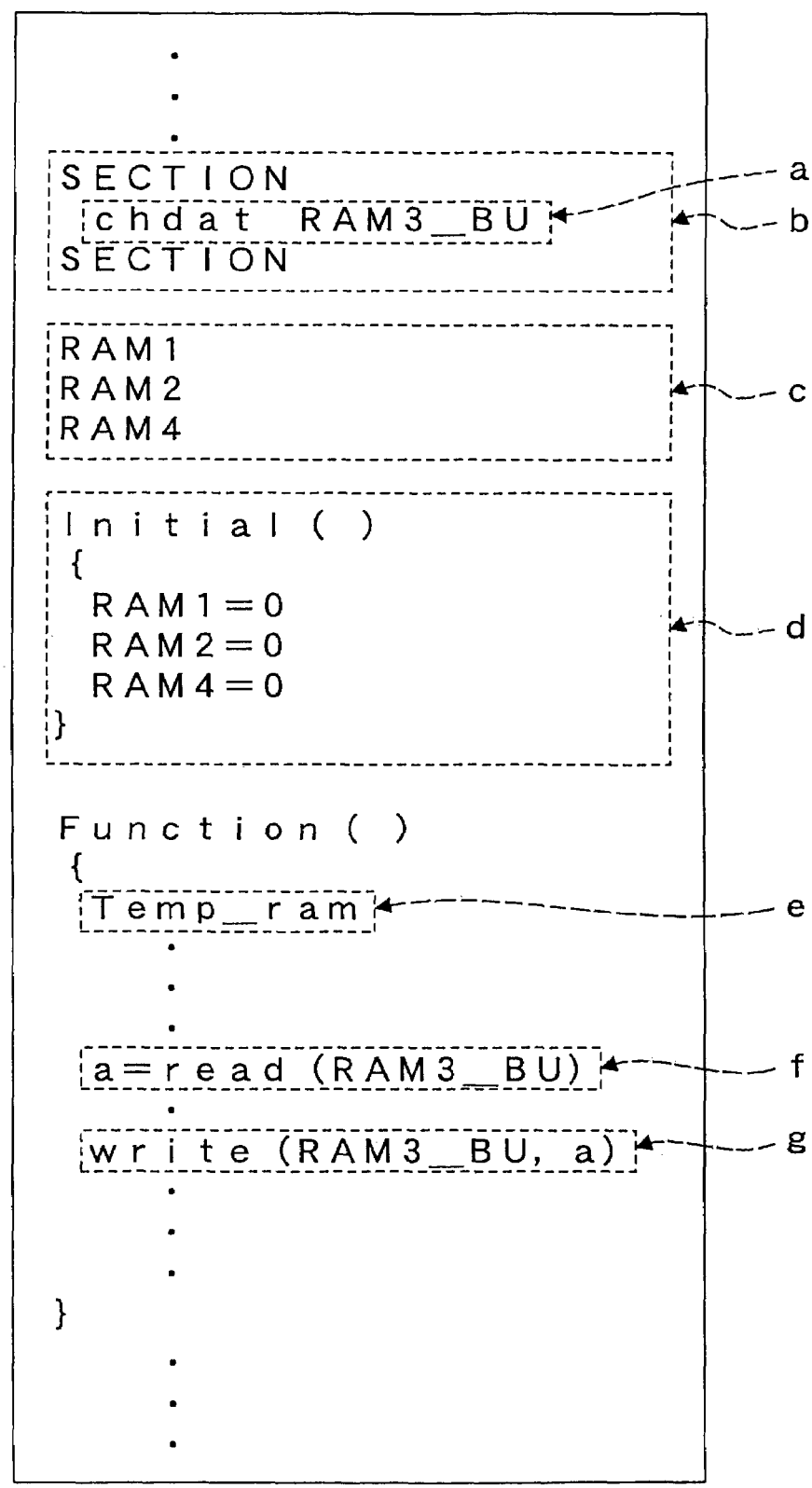
FIG. 4 is a schematic view showing an example of a part of generated program code according to the embodiment.

FIG. 4 shows a part of the program code generated from the model of the DFD shown in FIG. 2.

Since the variables RAM1, RAM2, RAM3_BU and RAM4 described in the DFD are the named variables, YES is returned at step S100 in FIG. 3. Furthermore, YES is also returned for the variable RAM3_BU at step S120. On the other hand, NO is returned for the other variables RAM1, RAM2 and RAM4 at step S120.

Thus, the variable RAM3_BU is determined as the specific data type global variable, and the corresponding program code segment is generated using this specific data type global variable (S150 in FIG. 3), as indicated by "a" in FIG. 4. Here, this is defined by a new data type of "chdat" in this embodiment. The definitive description of this variable RAM3_BU is then offset in a code section labelled SECTION, for example, (S160, FIG. 4) as indicated by "b" in FIG. 4.

The corresponding program code segment for the read process of the variable RAM3_BU is generated such that the corresponding program code segment calls a "read" macro (S180 in FIG. 3), as indicated by "f" in FIG. 4. The corresponding program code segment for the write process of the variable RAM3_BU is generated such that the corresponding program code segment calls a "write" macro (S180 in FIG. 3), as indicated by "g" in FIG. 4.

On the other hand, a program code segment for each of the variables RAM1, RAM2 and RAM4 is generated by using each of these variables RAM1, RAM2 and RAM4 as the ordinary global variable (S130 in FIG. 3), as indicated by "c" in FIG. 4. A variable initializing program code segment is generated for these variables RAM1, RAM2 and RAM4 (S140 in FIG. 3), as indicated by "d" in FIG. 4. A variable initializing program code segment is not generated for the variable RAM3_BU (S170 in FIG. 3).

When the corresponding variable is not a named variable (S100 in FIG. 3: NO), the variable is determined as an automatic variable, and a corresponding program code segment is generated using this automatic variable (S110 in FIG. 3). In FIG. 4, as indicated by "e", an automatic variable "Temp_ram" is defined in a function "Function".

Then, the program code thus generated is converted to object code by the compiler/linker 40 as shown in FIG. 1 and is embedded or installed in the ECU 50.

The operations of the ECU 50 enabled by the program code thus generated will be described.

Figure 5A:
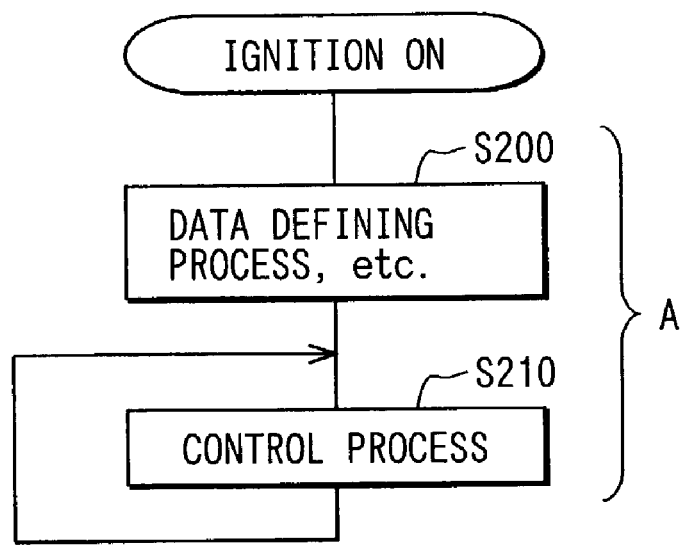
FIG. 5A is a flow chart of a process run by an electronic control unit (ECU) according to the embodiment.

As shown in FIG. 5A, the ECU 50 operations enabled by this program code are broadly divided into two types, a data defining process and etc. (S200) and a control process (S210) that is repeated after step S200. With reference to FIG. 4, the portions b, c and d correspond to this data defining process, and the portions of the function, which follow the data defining process, correspond to the control process.

Figure 6:
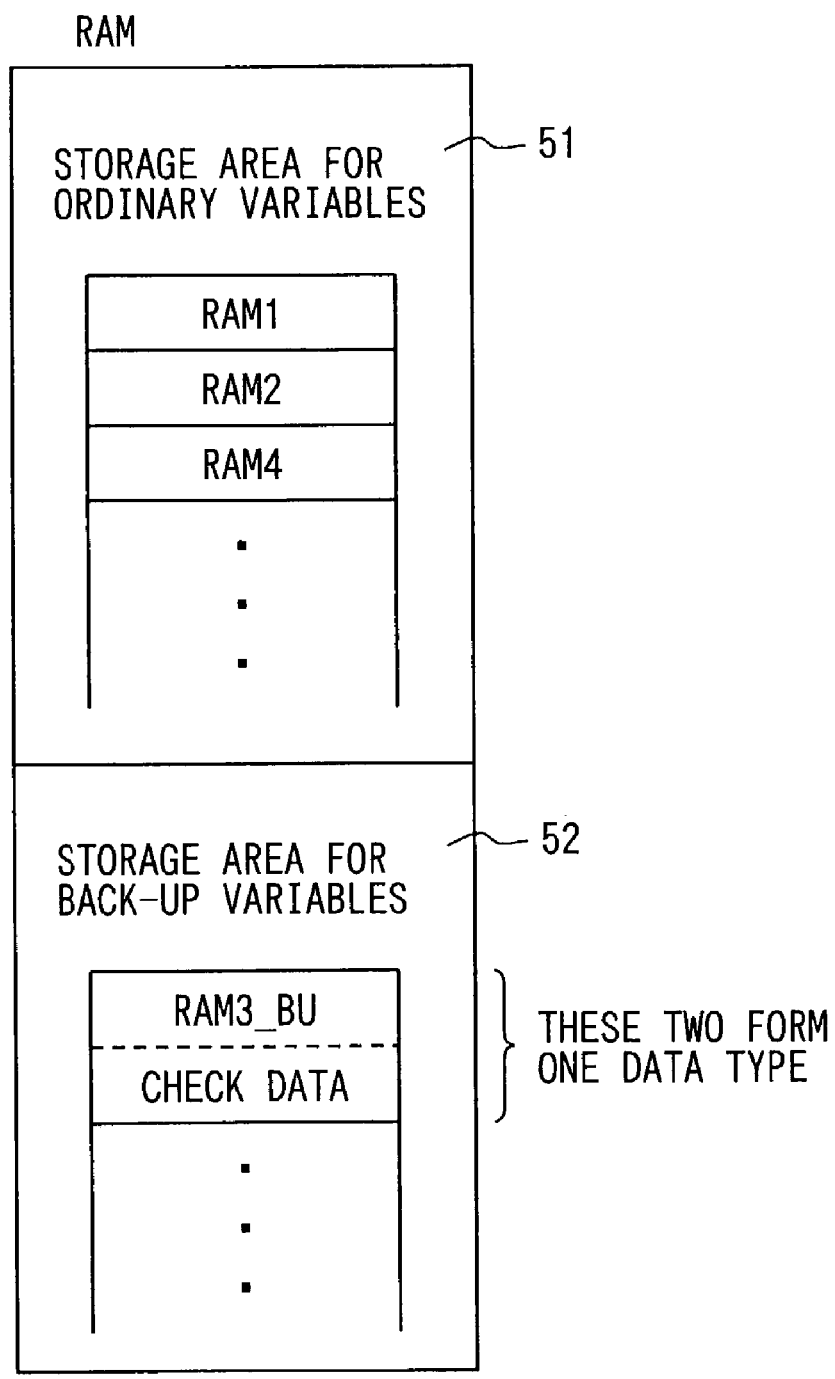
FIG. 6 is a schematic view showing variables stored in memory areas according to the embodiment.

As shown in FIG. 6, in the data defining process, the variables RAM1, RAM2 and RAM4 indicated by "c" in FIG. 4 are stored in a storage area (memory area) 51 for storing ordinary variables in a RAM of the ECU 50. Contrary to this, as indicated by "b" in FIG. 4, since the back-up variable RAM3_BU is offset in the code section (i.e., placed between SECTION and SECTION in FIG. 4), the compiler/liner 40 stores the back-up variable RAM3_BU in a storage area (memory area) 52 for storing back-up variables in the RAM of the ECU 50. Alternatively, the storage area 52 for storing the back-up variables can be formed using an EEPROM.

With the above arrangement, the content of the variable RAM3_BU can be retained even when the ignition key is turned off while the control process (S210) shown in FIG. 5A is running. Reading and writing performed on the variable RAM3_BU is also accelerated and real-time control can be achieved.

Furthermore, since the variable RAM3_BU is declared by the specific data type "chdat", the variable RAM3_BU is stored such that check data is added to the variable RAM3_BU, as shown in FIG. 6.

Figure 5B:
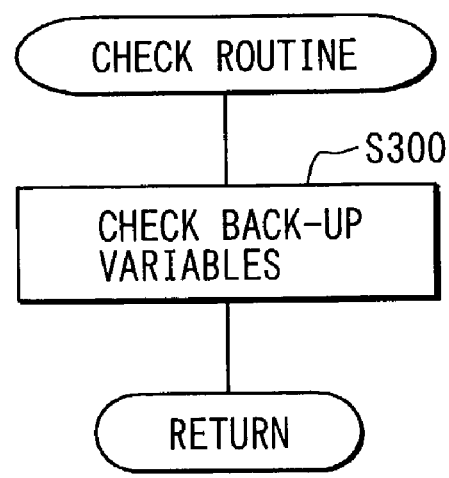
FIG. 5B is a flow chart of a check routine performed in the process shown in FIG. 5A.

Thus, it is possible to check the validity of back-up variable RAM3_BU while the control process (S210 in FIG. 5) runs by running an existing check routine, as shown in step S300 in FIG. 5B.

Furthermore, since a variable initializing program code segment is not generated for the variable RAM3_BU, the content of variable RAM3_BU can be appropriately stored or retained.

In addition, read and write processes for the variable RAM3_BU are achieved by calling the corresponding "read" macro or the corresponding "write" macro, as indicated by "f" and "g" in FIG. 4.

Figure 7A:
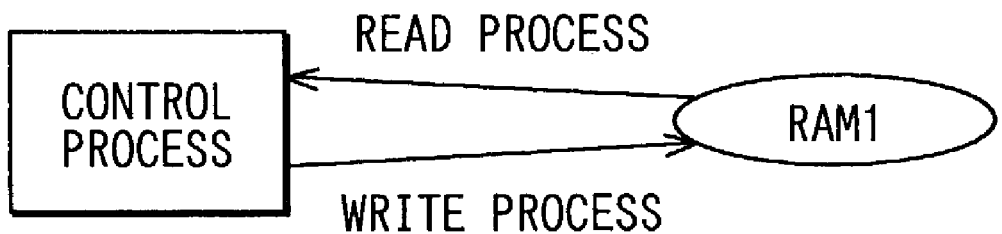
FIG. 7A is a schematic view showing write and read processes performed on an ordinary variable according to the present embodiment.
Figure 7B:
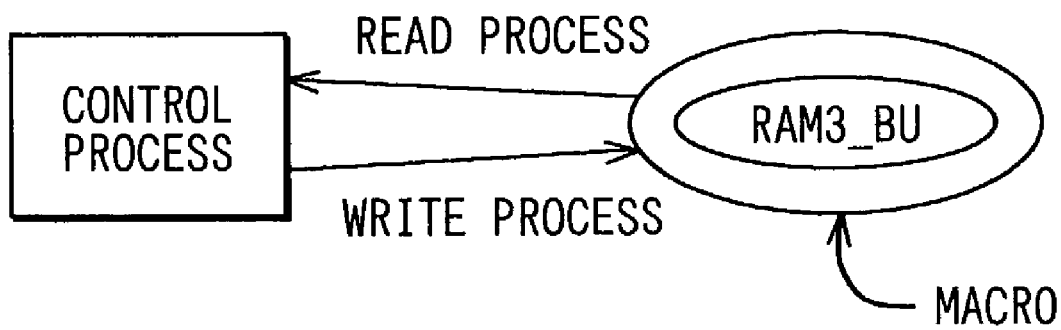
FIG. 7B is a schematic view showing write and read processes performed on a back-up variable using a corresponding macro according to the present embodiment.

As shown in FIG. 7A, a program code segment for an ordinary variable, such as RAM1, is generated such that the read process or the write process is directly performed on the ordinary variable. Contrary to this, a program code segment for the back-up variable RAM3_BU is generated such that the read process or the write process is indirectly performed on the back-up variable RAM3_BU through the corresponding macro, as shown in FIG. 7B.

Therefore, the provision of the appropriate macros allows check of validity of the variable, for example, at the read process of the variable.

Furthermore, the variables other than the named variables RAM1, RAM2, RAM3_BU, RAM4 are defined as the automatic variables as indicated by "e" in FIG. 4, so that the amount of memory in use can be reduced.

As described above, in the present embodiment, the variable information, which indicates whether the variable is a back-up variable, is added to the model in the form of variable name. In the code generating tool 1, the extraction engine 10 extracts a variable name and place it in an intermediate file. In this way, the variable information is obtained, and the code generation block 20 generates a corresponding vehicle specific program code segment for the back-up variable, which is the vehicle specific variable, using the variable generation rule 32 stored in the rule storage 30.

In this way, the program code for the vehicle control can be generated using the program code generation technique that uses the model written in the abstract language.

Furthermore, since the variable information in the form of predetermined variable name is added to the abstract language, the designer only needs to be aware of the variable names when creating the model. Also, the designer can advantageously determine whether the described variable is a back-up variable based on the model. Since this variable information is added in the form of variable name, the movement of variables in the model can be easily monitored, and whether a variable is a back-up variable or not can be also easily determined.

The present invention is not limited to the above embodiment and can be embodied in various other ways without departing from the scope of the present invention.

For example, in the above embodiment, the variable information in the form of the variable name in the predetermined type is added to the model.

It is alternatively possible to add this variable information in a form of a variable attribute of a predetermined type. In this way, no constraints are imposed on variable names, and a wide range of variables can be defined.

The variable information can be also integrally managed as separate information in a form of a file or database provided separately from the abstract language. In this way, the designer can easily see and understand a list of variables used.

Furthermore, in the above embodiment, the program code is generated such that the initialization of the back-up variable RAM3_BU is not performed.

Figure 8:
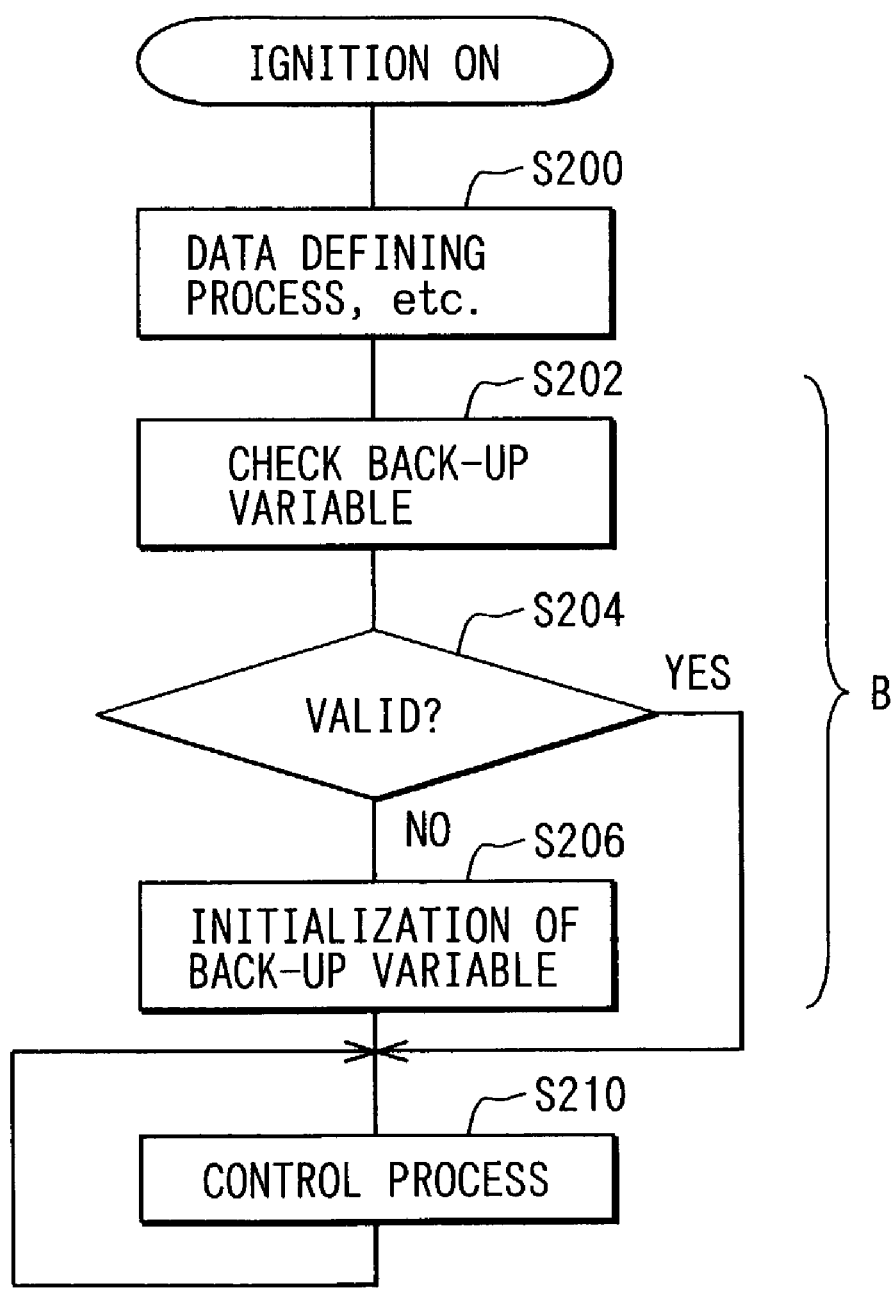
FIG. 8 is a flow chart showing a modification of the program generation.

Alternative to this, as shown in FIG. 8, a variable initializing program code segment can be generated to achieve the following processes. That is, after the data defining process and etc. (S200), a back-up variable is checked (S202). When the checked back-up variable is not valid (S204: NO), the back-up variable is initialized (S206). That is, the program code can be generated to achieve the processes (S202, S204, S206) indicated by "B" in FIG. 8 in addition to the processes (S200, S210) indicated by "A" in FIG. 5A.

This is due to the following reason. That is, the content of the back-up variable could become erroneous for some reasons. In such a case, the erroneous content needs to be replaced or substituted with an appropriate initial value (default value) provided for vehicle control. In this way, the appropriate initialization of the back-up variable is possible.

Even in the above case, it is possible to repeatedly check the back-up variable using the check routine shown in FIG. 5B during the execution of the control process (S210) in FIG. 8.

Additional advantages and modifications will readily occur to those skilled in the art. The invention in its broader terms is therefore, not limited to the specific details, representative apparatus, and illustrative examples shown and described.

What is claimed is:

1. A program code generator that is used to generate a control program, which is embedded in an electronic control unit to perform vehicle control, wherein the program code generator generates program code, which corresponds to a processing program that constitutes at least part of the control program, based on at least one program code generation rule when abstract language, which describes specifications of the processing program, is inputted to the program code generator, wherein the program code includes a plurality of program code segments, the program code generator comprising:

a variable information obtaining means for obtaining variable information, which indicates whether a variable contained in the abstract language is a vehicle specific variable or an ordinary variable, wherein the vehicle specific variable is a variable, content of which needs to be retained even when a vehicle power supply is turned off, and the vehicle specific variable is specific to the vehicle control; and a code generating means for generating at least one of the plurality of program code segments, wherein the code generating means generates a vehicle specific program code segment as one of the program code segments based on the variable information, which is obtained by the variable information obtaining means, through use of a corresponding one of the at least one generation rule, which corresponds to the vehicle specific variable when the variable contained in the abstract language is the vehicle specific variable.

2. A program code generator according to claim 1, wherein:

the vehicle specific variable is one of a plurality of vehicle specific variables contained in the abstract language; and the code generating means generates a program code segment as one of the program code segments for providing each memory area, which is assigned to a corresponding one of the vehicle specific variables for storing the corresponding vehicle specific variable, in a common specified memory area.

3. A program code generator according to claim 1, wherein the code generating means generates a program code segment as one of the program code segments for providing each memory area, which is assigned to the corresponding vehicle specific variable for storing the corresponding vehicle specific variable, wherein each memory area is provided along with a corresponding check data area, which stores check data of the corresponding vehicle specific variable, wherein the check data allows evaluation of validity of the corresponding vehicle specific variable.

4. A program code generator according to claim 1, wherein the code generating means generates a program code segment as one of the program code segments for checking validity of the corresponding vehicle specific variable.

5. A program code generator according to claim 1, wherein the code generating means generates a program code segment as one of the program code segments for restraining initialization of the corresponding vehicle specific variable.

6. A program code generator according to claim 5, wherein the code generating means generates a program code segment as one of the program code segments for substituting content of the corresponding vehicle specific variable with a default value when the corresponding vehicle specific variable is invalid.

7. A program code generator according to claim 1, wherein the code generating means generates a program code segment as one of the program code segments for calling a previously prepared library for at least one of a read process of the corresponding vehicle specific variable and a write process of the corresponding vehicle specific variable.

8. A program code generator according to claim 1, wherein the variable information is appended to the abstract language.

9. A program code generator according to claim 8, wherein the variable information is added to the abstract language in a form of a variable name of a predetermined type.

10. A program code generator according to claim 8, wherein the variable information is added to the abstract language in a form of a variable attribute of a predetermined type.

11. A program code generator according to claim 1, wherein the variable information is information provided separately from the abstract language.

12. A program code generator according to claim 1, wherein the code generating means generates a program code segment as one of the program code segments for defining the variable contained in the abstract language as an automatic variable when the variable contained in the abstract language is other than the vehicle specific variable.

13. A program code generator according to claim 1, wherein the vehicle specific variable is associated with learning value control performed in a vehicle.

14. A program code generator according to claim 1, wherein the code generating means generates the vehicle specific program code segment in such a manner that the vehicle specific program code segment causes storing of the vehicle specific variable in a storage area that is different from a storage area of the ordinary variable in the electronic control unit.

15. A computer program for generating program code, which corresponds to a processing program that constitutes at least part of a control program embedded in an electronic control unit to perform vehicle control, based on at least one program code generation rule when abstract language, which describes specifications of the processing program, is inputted, wherein the program code includes a plurality of program code segments, the computer program comprising instructions for:
   obtaining variable information, which indicates whether a variable contained in the abstract language is a vehicle specific variable or an ordinary variable, wherein the vehicle specific variable is a variable, content of which needs to be retained even when a vehicle power supply is turned off, and the vehicle specific variable is specific to the vehicle control; and
   generating a vehicle specific program code segment as one of the plurality of program code segments when the variable contained in the abstract language is the vehicle specific variable, wherein the vehicle specific code segment is generated based on the variable information through use of a corresponding one of the at least one generation rule, which corresponds to the vehicle specific variable.

16. A computer program according to claim 15, wherein the vehicle specific variable is associated with learning value control performed in a vehicle.

17. A computer program according to claim 15, wherein the generating of the vehicle specific program code segment includes generating the vehicle specific program code segment in such a manner that the vehicle specific program code segment causes storing of the vehicle specific variable in a storage area that is different from a storage area of the ordinary variable in the electronic control unit.

18. A method of generating program code corresponding to a processing program that constitutes at least part of a control program embedded in an electronic control unit to perform vehicle control, based on at least one program code generation rule when abstract language, which describes specifications of the processing program, is received, wherein the generated program code includes a plurality of program code segments, the method comprising:
   obtaining variable information, which indicates whether a variable contained in the abstract language is an ordinary variable or a vehicle specific variable that is specific to the vehicle control, wherein the vehicle specific variable is a variable, content of which needs to be retained even when a vehicle power supply is turned off; and
   generating at least one of the plurality of program code segments, wherein a vehicle specific program code segment is generated as one of the program code segments based on the obtained variable information through use of a corresponding one of the at least one generation rule, which corresponds to the vehicle specific variable when the variable contained in the abstract language is the vehicle specific variable.

19. A method according to claim 18, wherein:
   the vehicle specific variable is one of a plurality of vehicle specific variables contained in the abstract language; and
   a program code segment is generated as one of the program code segments for providing each memory area, which is assigned to a corresponding one of the vehicle specific variables for storing the corresponding vehicle specific variable, in a common specified memory area.

20. A method according to claim 18, wherein a program code segment is generated as one of the program code segments for providing each memory area, which is assigned to the corresponding vehicle specific variable for storing the corresponding vehicle specific variable, wherein each memory area is provided along with a corresponding check data area, which stores check data of the corresponding vehicle specific variable, and wherein the check data allows evaluation of validity of the corresponding vehicle specific variable.

21. A method according to claim 18, wherein a program code segment is generated as one of the program code segments for checking validity of the corresponding vehicle specific variable.

22. A method according to claim 18, wherein a program code segment is generated as one of the program code segments for restraining initialization of the corresponding vehicle specific variable.

23. A method according to claim 18, wherein a program code segment is generated as one of the program code segments for calling a previously prepared library for at least one of a read process of the corresponding vehicle specific variable and a write process of the corresponding vehicle specific variable.

* * * * *